Sept. 19, 1950     W. R. McCULLOCH     2,522,630
TAIL PIPE ADAPTER
Filed Dec. 2, 1948
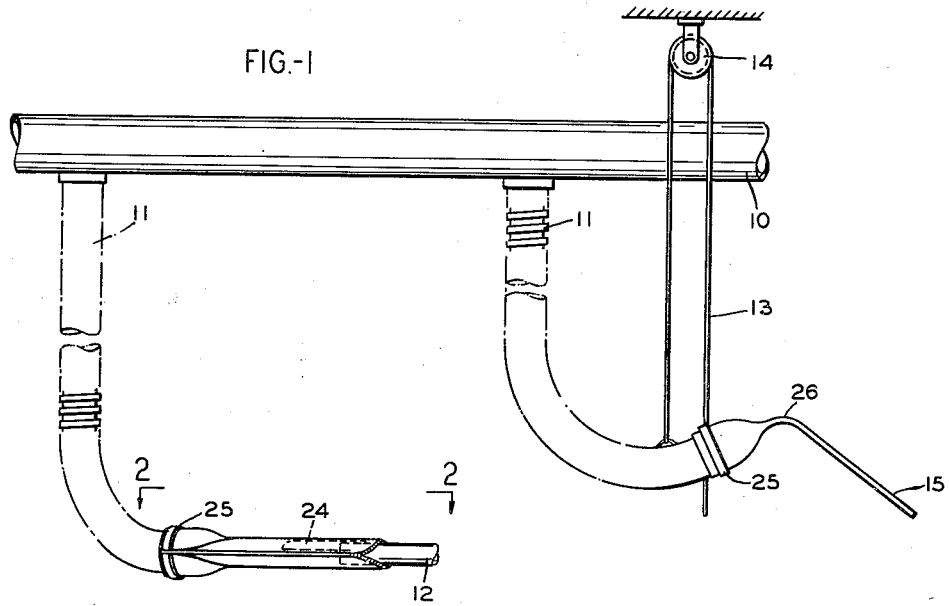
FIG.-1
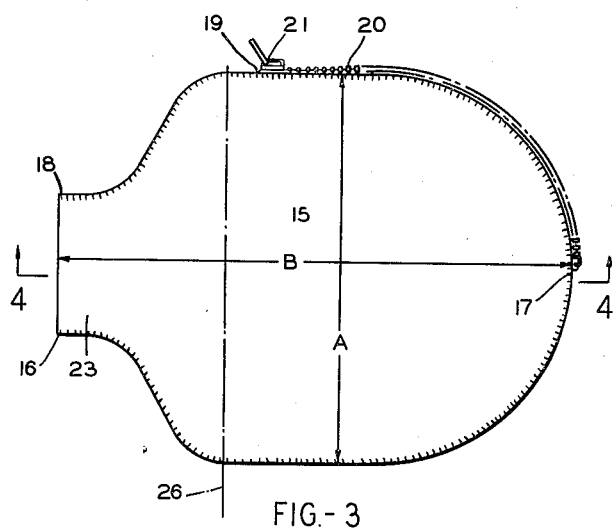
FIG.-2
FIG.-3
FIG.-4
INVENTOR.
WILLIAM R. McCULLOCH
BY
Hyde, Meyer, Baldwin & Doran
ATTORNEYS Patented Sept. 19, 1950

2,522,630

UNITED STATES PATENT OFFICE 2,522,630

TAIL PIPE ADAPTER

William R. McCulloch, Euclid, Ohio

Application December 2, 1948, Serial No. 63,064

5 Claims. (Cl. 285—90)

This invention relates to improvements in a tail pipe adapter for use in conducting exhaust gases away from internal combustion engines of the automotive type.

One of the objects of the present invention is to provide an inexpensive but efficient adapter for connecting the tail pipe of an automobile to an exhaust gas disposal system.

Another object of the present invention is to provide an adapter of the type described which may be used with tail pipes of varying diameters and whether equipped with exhaust gas diffuser heads or otherwise.

Still another object of the present invention is to provide an adapter of the type described which acts as a check valve substantially preventing the intake of air into an exhaust system when the adapter device is not in use.

Other objects and advantages of my invention will be apparent from the accompanying specification and drawings and the essential features will be set forth in the appended claims.

In the drawings,

Fig. 1 is a side elevational view of an exhaust gas system in a garage or the like equipped with my invention wherein one of my adapters is shown in use and the other is shown pulled up out of the way when not in use;

Fig. 2 is a top plan view taken along the line 2—2 of of Fig. 1 and showing the adapter itself;

Fig. 3 is a view similar to Fig. 2 but enlarged to more clearly show the construction; while Fig. 4 is a transverse sectional view taken along the line 4—4 of Fig. 3.

I have chosen to show my invention in connection with an overhead duct 10 in a garage or the like which is usually equipped with a fan or blower for the purpose of exhausting gases from the automotive equipment to a place outside or a place where no damage will be done to the occupants of the room. Leading from this duct are a plurality of flexible pipes 11 which communicate with the duct 10 and extend downwardly therefrom toward the floor in position to have the lower end connected to the tail pipe 12 of an automobile or the like. When one of the pipes 11 is not in use, as shown at the right hand side of Fig. 1, it is pulled up out of the way by means of a cord or cable 13 passing over an overhead pulley 14. While I have chosen to show my invention as applied to this overhead conduit system, it should be understood that it is equally applicable to a system which runs along the floor of the building or in a trench beneath the floor. In any case, my novel adapter is connected to a conduit 11 flexible or otherwise which leads the exhaust gases away to some desired point. Also, in any case, my adapter when not in use may remain connected to the exhaust conduit 11 and will act as a check valve as later described whether the device is pulled up in the air as shown in Fig. 1 or left lying on the floor or in a trench as mentioned above.

My improved adapter as clearly shown in Figs. 3 and 4 is generally flat when not in use and is composed of two generally parallel sheets 15a and 15b of flexible material sewed together about a major portion of their periphery from 16 to 17 as shown in Fig. 3 and from 18 to 19 as shown there also. The space between 16 and 18 is open to provide a neck leading into the main body of the adapter. The space between 17 and 19 is closed by a slide fastener 20 of known character which may close in either direction but in the present instance I have shown the closure member 21 in its open position near 19. The opening between the points 16 and 18 I shall hereinafter designate as 22 and the neck leading to this opening I shall designate as 23.

As shown in the drawings, the adapter in plan view is approximately spade form although those skilled in this art will realize that it is only necessary to have a shape of sufficient size to accommodate various tail pipes and their diffuser heads with a neck leading out of the adapter to the suction conduit 11 and with a closure member closing all or a part of the side of the device farthest removed from the neck.

I have shown my device as composed of layers 15a and 15b of a flexible material which may be cotton duck preferably fireproofed to withstand the usual temperatures encountered at the tail pipe of an automobile. My device is intended, however, for use with any flat flexible sheets adapted to carry out my purpose.

In one very satisfactory and useful form of my device, the width across the dimension A of Fig. 3 is approximately nine inches and the total length at the dimension B is approximately twelve inches while the distance between 16 and 18 across the open end of the neck is between four and four and one-half inches. All of these dimensions are given with the adapter in its flat condition before it is placed upon a tail pipe. The distance along the length of the slide fastener from 17 to 19 is then approximately nine to ten inches as measured around the perimeter of the adapter. I find that this device will fit tail pipes usually encountered and the size of the opening 22 corresponds to many of the exhaust conduit pipes 11 generally found today. The opening 22 may be made large and drawn down to pipe size by clamp 25. I believe, however, that with the use of my device these conduits 11 may be cut down in size because, as will later appear, certain features of my device prevent the loss of exhaust capacity through conduits 11 being left open when not in use. If this is the case, then the size of the opening 22 might be cut down. As is well understood, a good many of the tail pipes 12 are provided with flaring ends 24 for diffusing the exhaust gases. My adapter device does not require that these diffuser ends be removed from the tail pipe but they will pass through the slide fastener opening after which the closure member 21 may be run up as close as possible to the tail pipe as indicated in Fig. 2 so as to substantially effect a tight closure of the slide fastener opening around the tail pipe 12. The neck 23 is generally clamped to the exhaust conduit 11 by means of an annular clamp 25 or in any other suitable manner. By the use of this device the exhaust conduit 11 is quickly coupled to any tail pipe in such a manner as to provide a substantially leak proof joint between the tail pipe 12 and the exhaust conduit 11. Such leakage as occurs where the slide fastener opening is spread around the tail pipe is very small.

One of the advantages of my device is that it acts as a check valve when it is not in use. A typical instance is shown at the right hand side of Fig. 1 where the flexible conduit 11 is drawn up out of the way when it is not being used. In such a case, it is not necessary to make any change in the adapter 15. Instead, it is pulled up as shown and the flexibility causes the same to bend as indicated at 26. This causes the two flat sheets 15a and 15b to come together very closely so that they substantially seal off the leakage of the suction effect of the exhaust system at this point. This is true whether the slide fastener 20 is open or closed. A similar effect would take place if the adapter 15 were lying on the floor or in a trench when not in use. The effect of the two flat flexible sides 15a and 15b is similar to that of the well known gas mask type of valve and the suction on the exhaust conduit 11 only tends to collapse the flat sides against each other and effectively seals off any appreciable leakage at this point. I have shown the slide fastener opening between 17 and 19 as extending partially around one end and one side of the adapter as a whole. While a greater opening than this might be provided, I find that the opening as shown is sufficient for all purposes and calls for the shortest length of slide fastener within the limits of efficient use.

While I have shown sheets 15a and 15b sewed together, it will be obvious that they may be secured by other suitable means, such as by stapling or by the use of adhesives. I have shown a slide fastener 20, but some other suitable, quickly-adjustable closure means might be used.

What I claim is:

1. An adapter for connecting the tail pipe of an automotive vehicle to an exhaust conduit comprising two flat sheets of flexible material permanently secured together about their peripheries leaving two openings spaced from each other, a slide fastener for adjustably closing one of said openings, and said fastener-equipped opening being sufficiently large to receive said tail pipe.

2. An adapter for connecting the tail pipe of an automotive vehicle to an exhaust conduit comprising a container of flexible substantially nonstretchable material, there being a neck at one end of said container for attachment to said conduit, there being an opening in said container at a zone removed from said neck and of sufficient size to receive said tail pipe, and slide fastener means for closing said last named opening.

3. The combination of claim 1 wherein said two sheets of flexible material normally lie parallel and adjacent each other substantially entirely across said adapter and between said openings, whereby said adapter when not connected to a tail pipe acts as a check valve against air flow from said fastener-equipped opening to the other of said openings.

4. An adapter for connecting the tail pipe of an automotive vehicle to an exhaust conduit comprising two flat parallel sheets of flexible material substantially fire-proof at tail pipe exhaust gas temperatures, said sheets generally of spade form providing a neck at one end and a rounded end opposite thereto, means permanently securing the peripheries of said sheets together along the sides of said neck and around a portion of their remaining peripheries leaving a tail-pipe receiving opening there and an opening at the end of said neck, and a slide fastener for closing said tail-pipe receiving opening.

5. The combination of claim 4 wherein there is a zone extending substantially entirely across said adapter at approximately right angles to the axis of said neck where said sheets lie flat against each other when an exhaust conduit is connected to said neck, and said zone lying between said openings, whereby said adapter when not connected to a tail pipe acts as a check valve against air flow from said fastener-equipped opening to the other of said openings.

WILLIAM R. McCULLOCH.

REFERENCES CITED

The following references are of record in the file of this patent:

UNITED STATES PATENTS

| Number | Name | Date |
|---|---|---|
| 1,869,059 | Hanson | July 26, 1932 |